United States Patent
Honda

(10) Patent No.: US 8,484,409 B2
(45) Date of Patent: Jul. 9, 2013

(54) NONVOLATILE MEMORY CONTROLLER WITH LOGICAL DEFECTIVE CLUSTER TABLE

(75) Inventor: Toshiyuki Honda, Kyoto (JP)

(73) Assignee: Panasonic Corporation, Osaka (JP)

( * ) Notice: Subject to any disclaimer, the term of this patent is extended or adjusted under 35 U.S.C. 154(b) by 183 days.

(21) Appl. No.: 13/051,270

(22) Filed: Mar. 18, 2011

(65) Prior Publication Data

US 2011/0238898 A1    Sep. 29, 2011

(30) Foreign Application Priority Data

Mar. 24, 2010 (JP) .................................. 2010-067595

(51) Int. Cl.
G06F 12/06 (2006.01)

(52) U.S. Cl.
USPC .................... 711/103; 711/202; 711/E12.008

(58) Field of Classification Search
USPC ........................... 711/103, 170, 202, E12.008
See application file for complete search history.

(56) References Cited

U.S. PATENT DOCUMENTS

| | | | |
|---|---|---|---|
| 6,549,459 B2 | 4/2003 | Higuchi | |
| 2002/0048202 A1 | 4/2002 | Higuchi | |
| 2002/0083291 A1 | 6/2002 | Yoshimura | |
| 2002/0120826 A1* | 8/2002 | Venkatraman et al. | 711/207 |
| 2005/0229033 A1* | 10/2005 | Tanaka et al. | 714/6 |
| 2008/0250509 A1* | 10/2008 | Ahvenainen | 726/34 |
| 2008/0282045 A1* | 11/2008 | Biswas et al. | 711/159 |

FOREIGN PATENT DOCUMENTS

| | | |
|---|---|---|
| JP | 6-203480 | 7/1994 |
| JP | 2002-133892 | 5/2002 |
| JP | 2002-197890 | 7/2002 |

* cited by examiner

Primary Examiner — Hal Schnee
(74) Attorney, Agent, or Firm — Wenderoth, Lind & Ponack, L.L.P.

(57) ABSTRACT

A controller includes a control unit for controlling writing and/or reading of data to and from physical block based on a logical address from a host device, a logical defective cluster table for storing information concerning a logical address of a logical defective cluster which is one or more partial areas within the effective logical address range and an address conversion table for storing corresponding information of a logical address of the effective logical address range and a physical address of the physical block on the data stored in the physical block. Upon receiving a data write command from the host device for writing data to the logical address stored in the logical defective cluster table, the control unit disables the reflection of writing of data for the logical address to the physical block.

10 Claims, 12 Drawing Sheets

FIG. 2

| LOGICAL BLOCK ADDRESS (201) | PHYSICAL BLOCK ADDRESS (202) |
|---|---|
| 0000h | 0000h |
| 0001h | 0010h |
| ... | ... |
| 1F39h | 1000h |

FIG. 3

| PHYSICAL BLOCK ADDRESS |
|---|
| 0123h |
| 0456h |
| ... |
| 1FFFh |
| 2000h |
| ... |

FIG. 4

| LOGICAL BLOCK ADDRESS |
|---|
| 2000h |
| 2000h |
| 2000h |
| ... |

FIG. 9

| ADDRESS CONVERSION TABLE | |
|---|---|
| LOGICAL BLOCK ADDRESS | PHYSICAL BLOCK ADDRESS |
| 0000h | 0000h |
| 0001h | 0010h |
| ... | ... |
| 1F39h | 1000h |

| LOGICAL DEFECTIVE CLUSTER TABLE |
|---|
| LOGICAL BLOCK ADDRESS |
| 2000h |
| 2000h |
| 2000h |
| ... |

| INVALID BLOCK TABLE |
|---|
| PHYSICAL BLOCK ADDRESS |
| 0123h |
| 0456h |
| ... |
| 1FFFh |
| 2000h |
| ... |

| DEFECTIVE BLOCK TABLE |
|---|
| DEFECTIVE BLOCK ADDRESS |
| 2000h |
| 2000h |
| 2000h |
| ... |

NONVOLATILE MEMORY CONTROLLER WITH LOGICAL DEFECTIVE CLUSTER TABLE

BACKGROUND OF THE INVENTION

1. Field of the Invention

The present invention relates to a nonvolatile memory controller for controlling a nonvolatile memory such as a flash memory, and to a nonvolatile storage device using such nonvolatile memory controller.

2. Description of the Background Art

In recent years, as a nonvolatile storage device equipped with a NAND-type flash memory as a rewritable nonvolatile memory, memory cards are being used as the storage medium of digital cameras and mobile phones, and its market is expanding.

Moreover, pursuant to the yearly reduction in the bit unit price, nonvolatile storage devices are being used as an inexpensive storage device in markets other than memory cards; for example, as memories of SSD (Solid State Drive) used as a substitute of HDD (Hard Disk Drive), and its application is expanding.

A memory cell of the foregoing flash memory takes on a configuration of the floating gate retaining, in a nonvolatile manner, electrons between a control gate and a substrate in a MOS (Metal Oxide Semiconductor)-type transistor, and performs the erasure and writing of data by shifting the electrons between the substrate and the floating gate. Moreover, data is read from the memory cell of the flash memory by determining the amount of current that flows through the transistor configuring the flash memory.

As described above, since the erasure and writing of data are repeated to the memory cell of the flash memory, the electrons move between the substrate and the floating gate, and this causes the degradation of the insulator film (hereinafter referred to as the "gate insulator film") between the substrate and the floating gate. When the gate insulator film becomes degraded, electrons are leaked from the floating gate to the substrate via the defects existing in the gate insulator film, the writing efficiency deteriorates due to the influence of the electrons trapped in the defects of the gate insulator film, and this consequently causes defects in the erasure and writing of data.

A block that is subject to the foregoing erasure or writing error is referred to as a defective block, but the existence of defective blocks in the flash memory is unavoidable. When a defective block occurs, the controller controlling the flash memory needs to save the data in the defective block to another normal block, and perform control so that the erasure and writing of new data is not performed to the defective block.

Moreover, as another conventional technology, Japanese Patent Application Publication No. 2002-197890 discloses processing to be performed when a defective block occurs in a flash memory.

As described above, since a flash memory contains defective blocks, a memory card needs to notify the host device that it only has a capacity that is less than the capacity of the flash memory mounted in the memory card. For example, the effective capacity of a memory card or a USB flash with a capacity of 1 GB actually distributed in the market is smaller than 1 GB.

Although the effective capacity of a memory card is decided upon anticipating the existence and occurrence of defective blocks in advance as described above, if numerous defective blocks occur as a result of repeating the rewriting of data, it becomes impossible to maintain the effective capacity that was notified to the host device to which the memory card is connected, and there is a problem in that writing can no longer be performed.

SUMMARY OF THE INVENTION

An object of this invention is to provide a nonvolatile memory controller and a nonvolatile storage device capable of writing new data even with the occurrence of defective blocks.

The nonvolatile memory controller according to one aspect of the present invention is a nonvolatile memory controller for controlling a nonvolatile memory configured from a plurality of physical blocks. This nonvolatile memory controller comprises a control unit for controlling writing and/or reading of data to and from the physical blocks based on a logical address, from an external device, within an effective logical address range from a minimum logical address to a maximum logical address, a logical defective cluster table for storing information concerning a logical address of a logical defective cluster which is one or more partial areas within the effective logical address range and in which reflection of the writing of data to the logical address is disabled, and an address conversion table for storing corresponding information of a logical address of the effective logical address range and a physical address of the physical block on the data stored in the physical block. Upon receiving a data write command from the external device for writing data to the logical address stored in the logical defective cluster table, the control unit disables the reflection of writing of data for the logical address to the physical block.

According to the foregoing configuration, it is possible to provide a nonvolatile memory controller and a nonvolatile storage device capable of writing new data even with the occurrence of defective blocks.

These and other objects, features and advantages of the present invention will become more apparent upon reading the following detailed description along with the accompanying drawings.

BRIEF DESCRIPTION OF THE DRAWINGS

FIG. 2 is a diagram showing an example of the configuration of an address conversion table of the memory card depicted in FIG. 1;

FIG. 3 is a diagram showing an example of the configuration of an invalid block table of the memory card depicted in FIG. 1;

FIG. 4 is a diagram showing an example of the configuration of a logical defective cluster table of the memory card depicted in FIG. 1;

FIG. 9 is a diagram showing the state of the respective tables before being updated with the write processing of the memory card depicted in FIG. 1;

DESCRIPTION OF THE PREFERRED EMBODIMENTS

Figure 1:
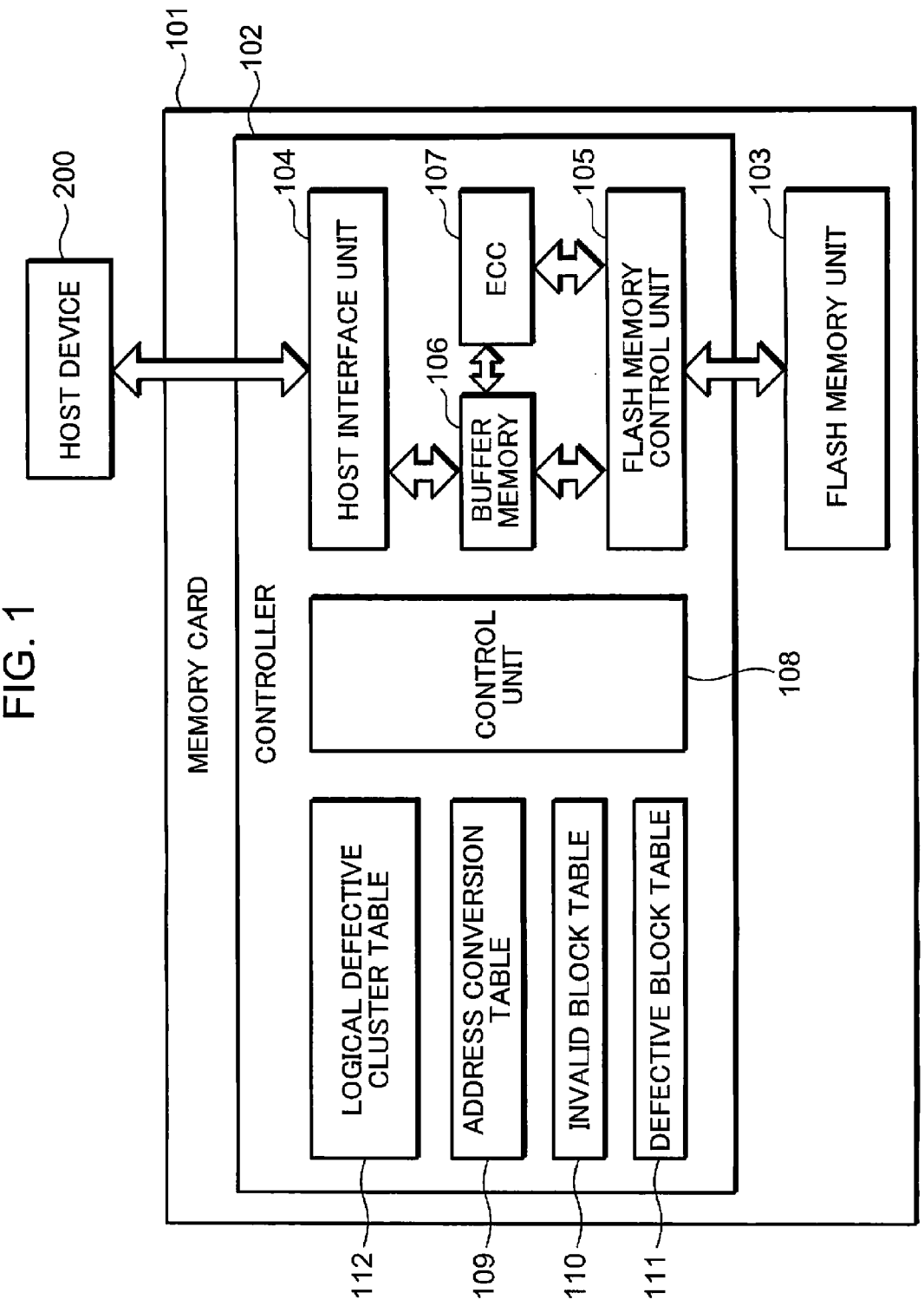
FIG. 1 is a diagram showing the configuration of a memory card according to an embodiment of the present invention.

A memory card according to an embodiment of the present invention is now explained with reference to the attached drawings. FIG. 1 is a block diagram showing the configuration of the memory card according to an embodiment of the present invention.

<1. Configuration of Memory Card>

The memory card 101 performs the reading and/or writing of data according to commands from an external host device 200 by being connected to the host device 200 and bi-directionally communicating with the host device 200.

The memory card 101 comprises a controller 102 and a flash memory unit 103. The controller 102 controls the interface of the memory card 101 and the host device 200, and also controls the flash memory unit 103.

The flash memory unit 103 is configured from a flash memory as one type of nonvolatile memory. Although not shown, a flash memory is configured from a plurality of physical blocks, and a physical block is configured from a plurality of memory cells. A physical block is a data erase unit in the flash memory.

Here, the memory card 101 is an example of a nonvolatile storage device, the controller 102 is an example of a nonvolatile memory controller, and the flash memory unit 103 is an example of a storage unit including a rewritable nonvolatile memory. Moreover, as examples of the host device 200, there are, for example, a digital camera, a mobile phone, a video recorder, a computer and the like.

The memory card 101 writes data into the flash memory unit 103 or reads data from the flash memory unit 103 according to the writing or reading control of data, for which an address has been designated, from the external host device 200. Designation of the address from the outside is performed within a sequential address range from a minimum logical address to a maximum logical address (hereinafter referred to as the "effective logical address range") included in the memory card 101.

The controller 102 comprises a host interface unit 104, a flash memory control unit 105, a buffer memory 106, an ECC 107, a control unit 108, an address conversion table 109, an invalid block table 110, a defective block table 111, and a logical defective cluster table 112.

The host interface unit 104 controls the interface with the host device 200. The flash memory control unit 105 controls the flash memory unit 103. The buffer memory 106 is a volatile buffer memory for temporarily storing data upon transferring, to and from the flash memory unit 103, write data from the host device 200 or read data to the host device 200.

The ECC 107 is an ECC (Error Checking and Correction) circuit which creates an ECC (Error Correcting Code) to be added upon writing data into the flash memory unit 103, and corrects the read data upon reading data from the flash memory unit 103.

The control unit 108 is connected to the respective blocks via wiring not shown, and performs the internal control of the overall controller 102 by controlling the operation of the respective blocks. Moreover, the control unit 108 controls the writing and/or reading of data to and from the physical blocks of the flash memory 103 based on the logical address within the effective logical address range designated by the host device 200.

The address conversion table 109 stores corresponding information of the address (logical address) designated by the host device 200, and the address (physical address) of the physical blocks of the flash memory unit 103. The range of the logical address referred to above corresponds to the foregoing effective logical address range, and the address conversion table 109 stores the corresponding information of the logical address of the effective logical address range and the physical address of the physical blocks of the data stored in the physical blocks.

The invalid block table 110 stores a list of addresses of physical blocks in which valid data is not written in the flash memory unit 103 and which are not defective blocks (not managed by the defective block table 111). Specifically, the invalid block table 110 stores the physical address of physical blocks in which data corresponding to the logical address is not stored and to which the writing of new data can be performed, and physical blocks which can be used for writing data are registered in the invalid block table 110.

The defective block table 111 stores a list of physical addresses of defective blocks in the flash memory unit 103.

The logical defective cluster table 112 is a table for defining a logical address within the effective logical address range for the memory card 101 to disable access from the host device 200.

Specifically, the logical defective cluster table 112 stores information concerning a logical address of a logical defective cluster which is one or more partial areas within the effective logical address range and in which reflection of the writing of data to the logical address is disabled. Moreover, upon receiving a data write command from the host device 200 for writing data to the logical address stored in the logical defective cluster table 112, the control unit 108 disables the reflection of writing of data for the logical address, to the physical blocks of the flash memory unit 103.

<2. Configuration Example of Various Tables>

FIG. 2 is a diagram showing an example of the configuration of the address conversion table 109. The address conversion table 109 associates and stores information of the logical block address 201 and information of the physical block address 202. Here, the logical address range (effective logical address range) is partitioned into logical blocks in units which are equivalent to the capacity of the physical blocks of the flash memory unit 103, and information concerning the logical address for specifying the respective logical blocks is set as the information of the logical block address 201. Meanwhile, information of the physical block address 202 is information of the physical address for specifying the physical blocks. In the address conversion table 109, one record is configured from a pair of one logical block address 201 and the physical block address 202 of the corresponding flash memory unit 103.

For example, data corresponding to the logical block address "0000h" is stored in the physical block of the physical block address "0000h"; that is, the physical block of the address "0000h" in the flash memory unit 103, and data corresponding to the logical block address "0001h" is stored in the physical block of the physical block address "0010h"; that is, the physical block of the address "0010h" in the flash memory unit 103. Moreover, an address for the range from 0000h to 1F39h is managed as the logical block address.

FIG. 3 is a diagram showing an example of the configuration of the invalid block table 110. The invalid block table 110 stores information; for example, 0123h, 0456h, . . . , concerning the physical block address as the address of physical blocks storing invalid data in the flash memory unit 103. Note that the address range of the physical blocks of the flash memory unit 103 is set to the range of 0000h to 1FFFh, and 2000h is treated as an invalid value in the invalid block table 110.

The configuration of the defective block table 111 is the same as the foregoing invalid block table 110, and stores the address of physical blocks of defective data in the flash memory unit 103. Specifically, the defective block table 111 stores information concerning the physical block address of defective blocks, and 2000h is treated as an invalid value.

FIG. 4 is a diagram showing an example of the configuration of the logical defective cluster table 112. Information concerning the address of the logical block in which the flash memory card 101 disable access from the host device 200; that is, information concerning the logical address of the logical defective cluster is stored as the logical block address. Note that the logical defective cluster table 112 also treats 2000h as an invalid value as with the invalid block table 110. In the example of FIG. 4, all logical block addresses are in a state of being an invalid logical block address.

<3. Configuration Example of Flash Memory Unit>

Figure 5:
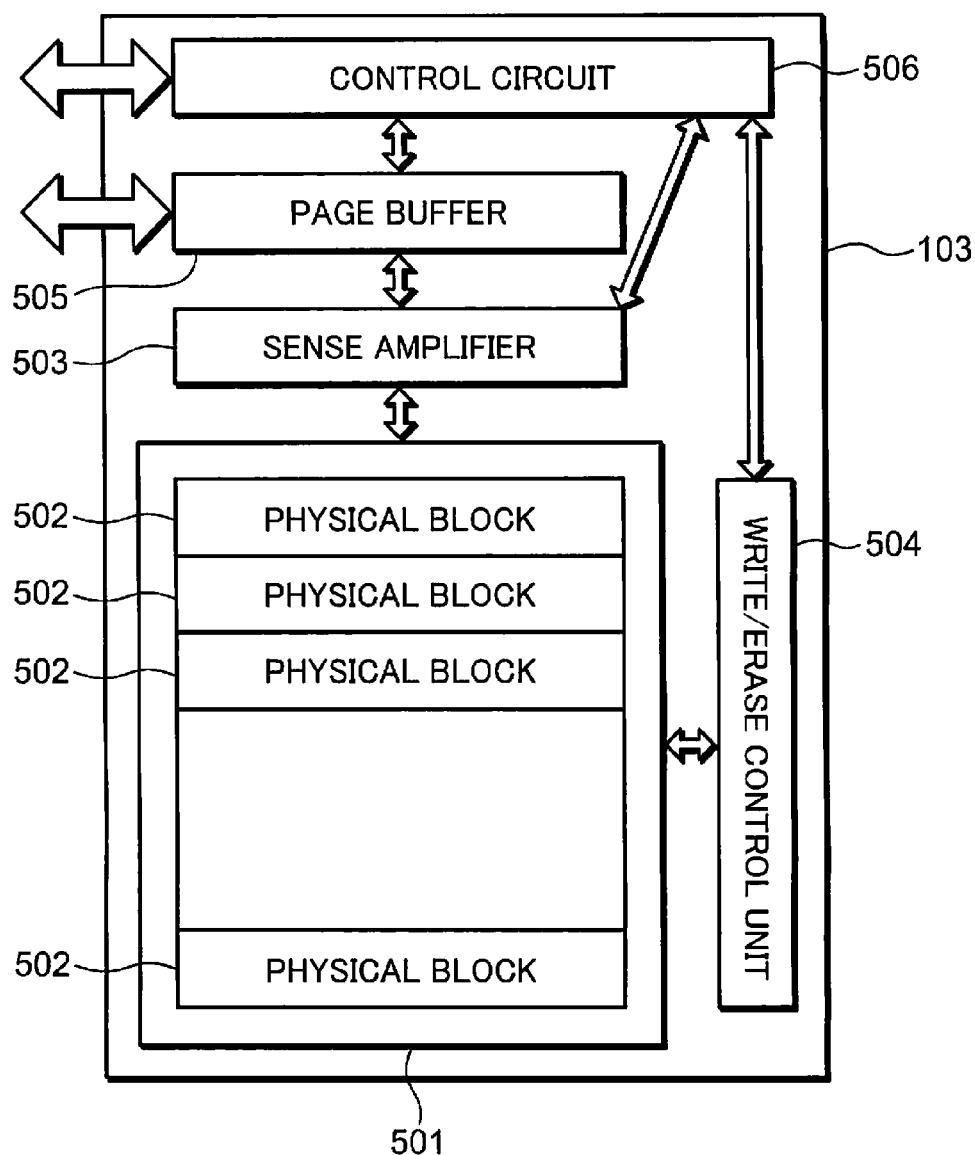
FIG. 5 is a diagram showing an example of the configuration of a flash memory unit of the memory card depicted in FIG. 1.

FIG. 5 is a diagram showing an example of the configuration of the flash memory unit 103. The flash memory unit 103 internally comprises a memory cell array 501 configured from a plurality of memory cells for storing data in a nonvolatile manner. The storable capacity in the memory cell array 501 is the storage capacity of the flash memory unit 103. The memory cell array 501 is configured from a plurality of physical blocks 502. The physical block 502 is a data erase unit in the flash memory unit 103.

In this embodiment, since 0000h to 1FFFh are used as the physical block addresses, explained is a case where there are 2000h (8192) physical blocks 502.

The flash memory unit 103 comprises a sense amplifier 503 for reading data of the memory cells, a write/erase control unit 504 for erasing data of the memory cells or writing data into the memory cells, a page buffer 505, and a control circuit 506.

Data read with the sense amplifier 503 and data to be written with the write/erase control unit 504 are temporarily stored in the page buffer 505 in the flash memory unit 103. Moreover, data to be read from or written into the flash memory unit 103 by the controller 102 is stored in the page buffer 505.

The control circuit 506 controls the overall flash memory unit 103. The control circuit 506 enables the writing and reading of data from the controller 102 by performing the internal control of the flash memory unit 103.

Figure 6:
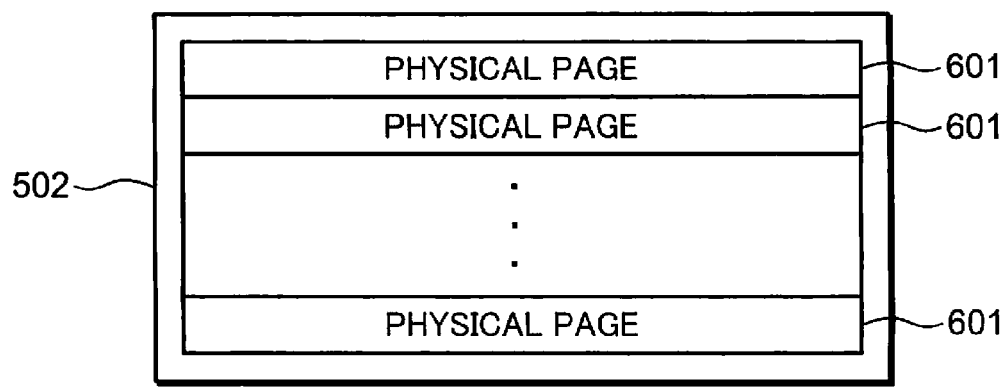
FIG. 6 is a schematic diagram explaining the internal configuration of a physical block of the flash memory unit of the memory card depicted in FIG. 1.

FIG. 6 is a schematic diagram explaining the internal configuration of the physical block 502. The physical block 502 is configured from a plurality of physical pages 601. Whereas the physical block 502 is a data erase unit in the flash memory unit 103, the physical page 601 is a data write unit in the flash memory unit 103.

<4. Write/Read Processing>
<4.1 Read Processing>

Figure 7:
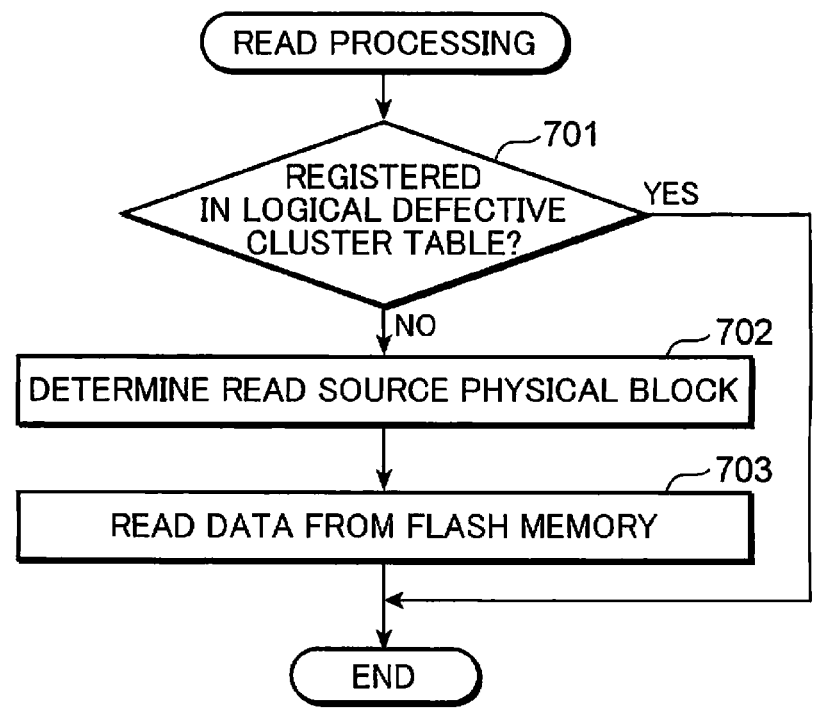
FIG. 7 is a flowchart of the read processing of the memory card depicted in FIG. 1.

FIG. 7 is a flowchart showing the operation of the control unit 108 in the data read processing for reading data from the memory card 101. The memory card 101 starts the read processing based on a read command from the host device 200 designating the logical address.

The determination processing 701 is foremost explained. The control unit 108 refers to the logical defective cluster table 112, and determines whether the logical address from the host device 200 is registered in the logical defective cluster table 112 as the logical block address. If the logical block address is registered, since the logical address from the host device 200 is an address to which access should be disabled, the control unit 108 ends the read processing as is and does not output data to the host device 200.

Meanwhile, if the logical block address is not registered, the control unit 108 performs the processing 702 and determines the read source physical block. Specifically, the control unit 108 refers to the address conversion table 109 and determines, as the read source physical block, the physical block of the physical block address in the address conversion table 109 corresponding to the logical block address designated by the host device 200.

The processing 703 is now explained. The control unit 108 reads data from the read source physical block of the flash memory unit 103 determined at the processing 702, and transfers the data from the read source physical block of the flash memory unit 103 to the host device 200.

Note that, in cases where the logical defective cluster table 112 is as shown in FIG. 4; that is, if all logical block addresses are an invalid value, determination of disabling access is not made at the determination processing 701.

Moreover, although it was explained that data is not output to the host device 200 if the logical block address is registered in the logical defective cluster table 112 at the determination processing 701, the configuration may also be such that a predetermined fixed value is output. Moreover, if the logical block address is registered in the logical defective cluster table 112, since a valid physical block address is not registered in the address conversion table 109 in relation to the registered logical block address, other processing may be perform so as long as the processing can be performed without the valid physical block address.

<4.2 Write Processing>

Figure 8:
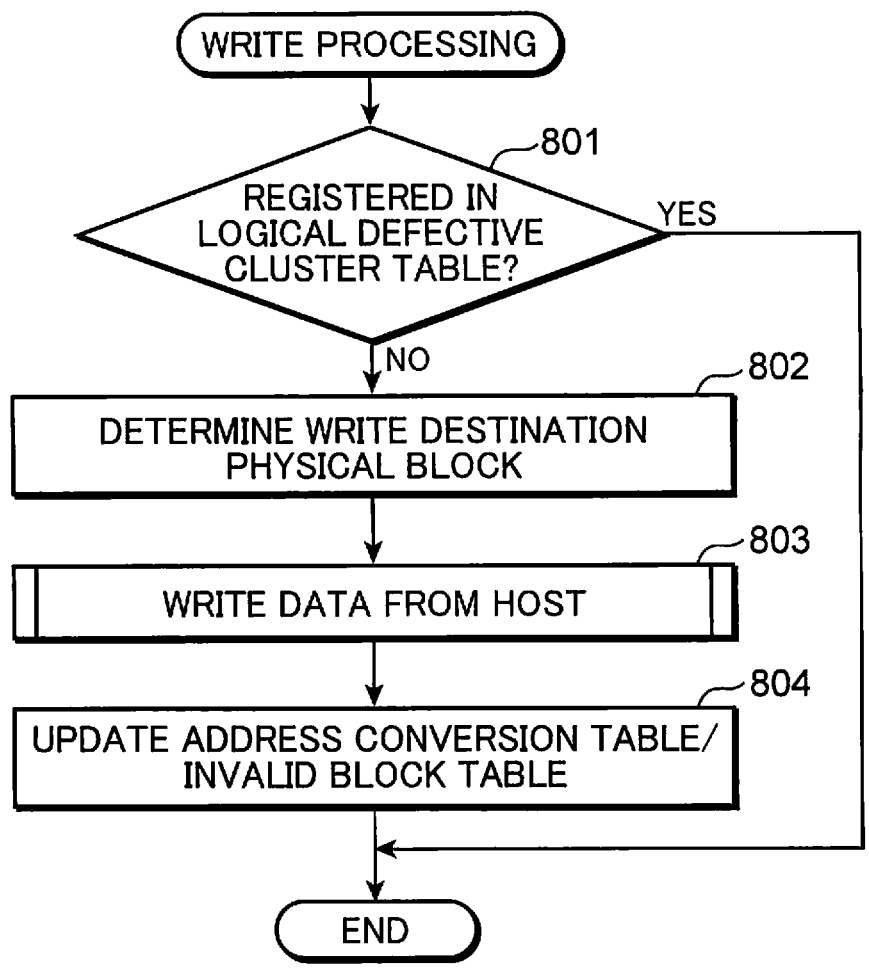
FIG. 8 is a flowchart of the write processing of the memory card depicted in FIG. 1.

FIG. 8 is a flowchart of the operation of the control unit 108 in the data write processing for writing data into the memory card 101. The memory card 101 starts the write processing based on a write command from the host device 200 designating the logical address.

The determination processing 801 is foremost explained. The control unit 108 refers to the logical defective cluster table 112, and determines whether the logical address from the host device 200 is registered in the logical defective cluster table 112 as the logical block address. If the logical block address is registered, since the logical address from the host device 200 is an address to which access should be disabled, the control unit 108 ends the write processing as is.

Meanwhile, if the logical block address is not registered, the control unit 108 performs the processing 802 and determines the write destination physical block. Specifically, the control unit 108 refers to the invalid block table 110, selects a physical block to which the writing of new data can be performed among the physical block addresses registered in the invalid block table 110, and determines the selected physical block as the write destination physical block.

The processing 803 is now explained. The control unit 108 performs the writing of data from the host device 200. Specifically, the control unit 108 transfers to and writes into, the write destination physical block of the flash memory unit 103 determined at the processing 802, the write data that was transferred from the host device 200. Here, if the write data from the host device 200 is less than a physical block unit, data that was previously written into the flash memory unit 103 is used to cause the write data to become data of a physical block unit, and the write data is thereby written into the flash memory unit 103. This kind of processing is required because, as described later, data of the flash memory unit 103 can only be rewritten in data erase units.

The processing 804 is now explained. The control unit 108 updates the address conversion table 109 and the invalid block table 110. Specifically, the control unit 108 updates the address conversion table 109 and the invalid block table 110 by interchanging the physical block address in the address conversion table 109 corresponding to the logical block address designated by the host device 200, and the physical block address of the write destination physical block (physical block address of the invalid block table 110 selected at the processing 802).

A specific example of the table update processing in the write processing at the processing 804 is now explained. FIG. 9 is a diagram showing a state of the respective tables before being updated with the write processing. In FIG. 9, the address conversion table 109 is the same state as FIG. 2, the invalid block table 110 is the same state as FIG. 3, and the logical defective cluster table 112 is the same state as FIG. 4. All defective block addresses (physical block addresses) of the defective block table 111 are an invalid value.

If the address designated from the host device 200 is the logical block address "0001h" in the foregoing state and the physical block address "0123h" of the invalid block table 110 is selected as the write destination physical block at the processing 802, the respective tables are updated at the processing 804 as described below.

Figure 10:
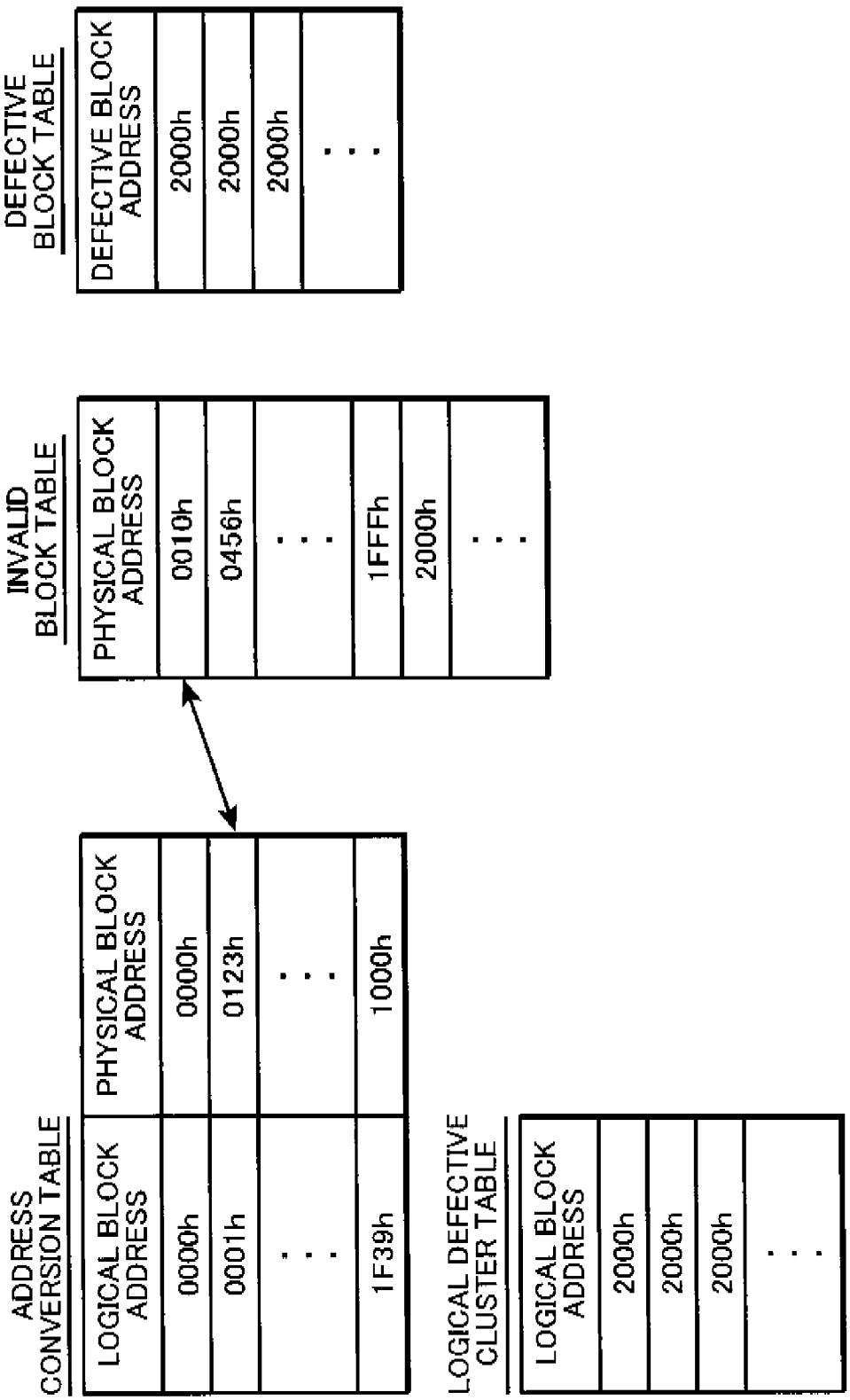
FIG. 10 is a diagram showing the state of the respective tables after being updated with the write processing of the memory card depicted in FIG. 1.

FIG. 10 is a diagram showing the state of the respective tables after being updated with the write processing. The control unit 108 converts the physical block address "0010h" corresponding to the logical block address designated by the host device 200 of the address conversion table 109, and the physical block address "0123h" of the invalid block table 110. Consequently, as shown in FIG. 10, the physical block address corresponding to the logical block address of the address conversion table 109 becomes "0123h", and the physical block address of the invalid block table 110 becomes "0010h".

Note that if the logical block address is registered in the logical defective cluster table 112 at the determination processing 801, the write processing is ended as is. This is based on the assumption that the host device 200 will confirm whether data writing was properly performed by reading the data after such data is written.

Nevertheless, the scheme may also be where the memory card 101 notifies an error to the host device 200 for the host device 200 to recognize that data writing could not be performed properly. For example, at the determination processing 801, if the control unit 108 determines that the logical block address from the host device 200 is registered in the logical defective cluster table 112, the control unit 108 may end the write processing, and send writing error information to the host device 200 in order to notify that data writing could not be performed properly.

<4.3 Defective Block Registration Upon Write Processing>

Figure 11:
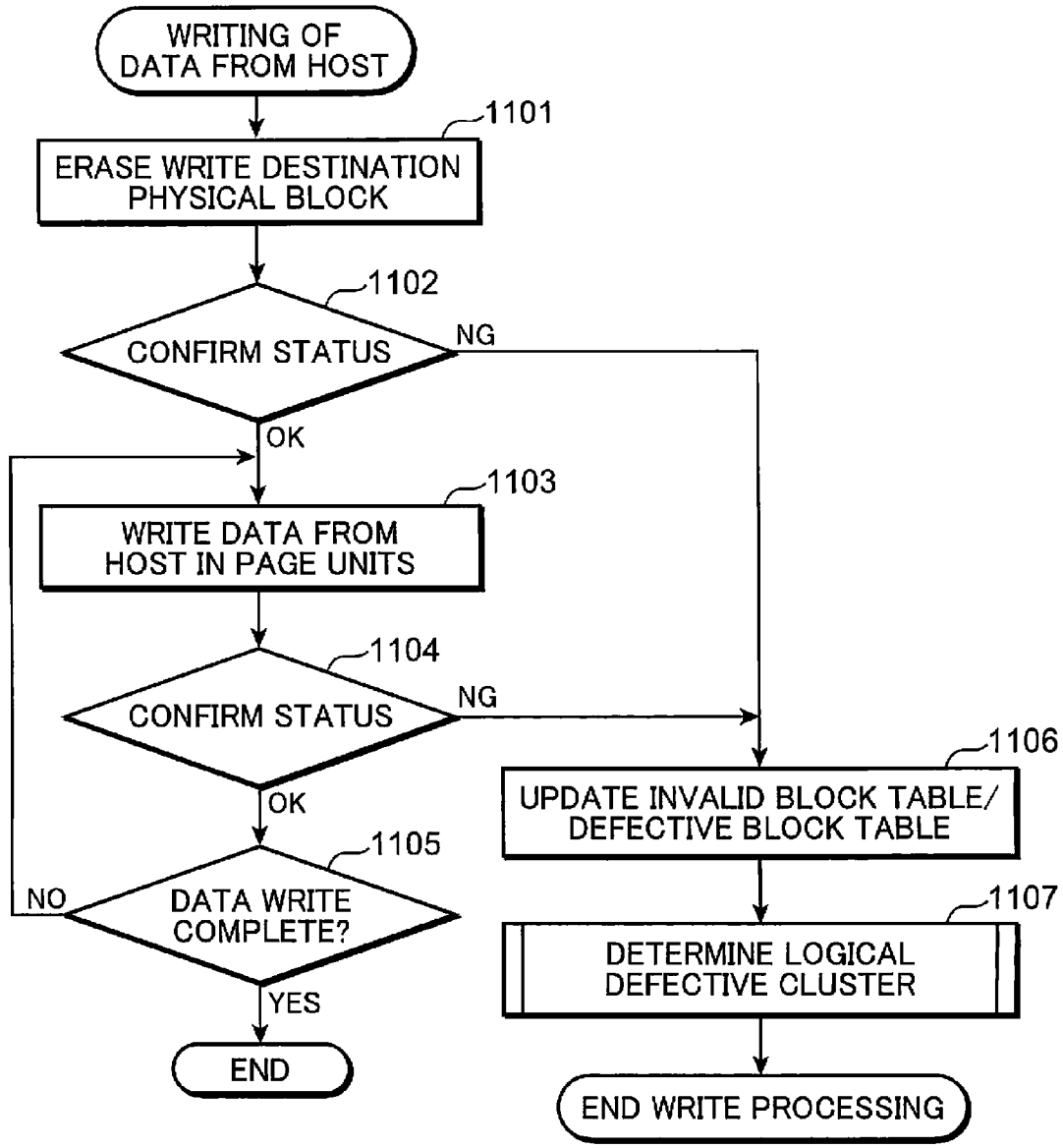
FIG. 11 is a flowchart of the data writing of the memory card depicted in FIG. 1.

FIG. 11 is a detailed flowchart of the data write processing 803 of the flowchart shown in FIG. 8.

The processing 1101 is foremost explained. The control unit 108 erases the write destination physical block. Specifically, the control unit 108 issues a command to the flash memory unit 103 for designating the physical address of the write destination physical block and erasing the data. The control circuit 506 of the flash memory unit 103 uses the write/erase control unit 504 to erase the data of the corresponding physical block.

However, there is a possibility that a delayed defective block will occur in the erase processing performed to the flash memory unit 103. Although the probability of such a delayed defective block is low, it may cause the erasure of data of the physical block to fail. In the foregoing case, the flash memory unit 103 outputs the failure of erasure to the control unit 108 as its status. The following determination processing 1102 is thereby performed.

The determination processing 1102 is now explained. The control unit 108 determines whether the erase processing at the processing 1101 was successful, or had failed and the physical block needs to be managed as a defective block by acquiring a status from the flash memory unit 103; for example, a status showing that the erase processing was successful or a status showing that the erase processing had failed. If the erase processing is successful, the routine proceed to the processing 1103, and if the erase processing had failed, the routine proceeds to the processing 1106.

The processing 1103 is now explained. The control unit 108 writes the data from the host device 200 in physical page units as the write unit of the flash memory unit 103.

However, there is a possibility that a delayed defective block will occur in the write processing performed to the flash memory unit 103 as in the erase processing. The determination processing 1104 is therefore performed. The control unit 108 determines whether the write processing at the processing 1103 was successful, or had failed and the physical block needs to be managed as a defective block by acquiring a status from the flash memory unit 103; for example, a status showing that the write processing was successful or a status showing that the write processing had failed. If the write processing is successful, the routine proceed to the processing 1105, and if the write processing had failed, the routine proceeds to the processing 1106.

The determination processing 1105 is now explained. The control unit 108 determines whether the entire write processing is complete. If unwritten data still remains, the routine returns to the processing 1103, and if the writing of data is complete, the processing is ended.

The processing 1106 is now explained. The control unit 108 updates the invalid block table 110 and the defective block table 111. Specifically, the control unit 108 migrates the physical address of the write destination physical block, which needs to be managed as a defective block, to the defective block table 111 as the physical block address. The migration processing of the physical block address is performed by interchanging the physical block address of the write destination physical block of the invalid block table 110 with an invalid value, and interchanging the invalid value of the defective block table 111 with the physical block address of the write destination physical block.

The processing 1107 is now explained. The control unit 108 performs the determination processing of the logical defective cluster, and ends the writing processing after the determination processing of the logical defective cluster. Here, the write processing is ended without performing the processing 804 since the write data from the host device 200 could not be subject to proper write processing. The foregoing determination processing of the logical defective cluster will be explained later.

A specific example of the update processing of the respective tables at the processing 1106 in the write processing shown with the flowchart in FIG. 11 is now explained. Let it be assumed that the state of the tables before performing the processing 1106 is shown in FIG. 10. If "1FFFh" is selected as the physical block address of the write destination physical block from the foregoing state, the tables are updated as described below.

Figure 12:
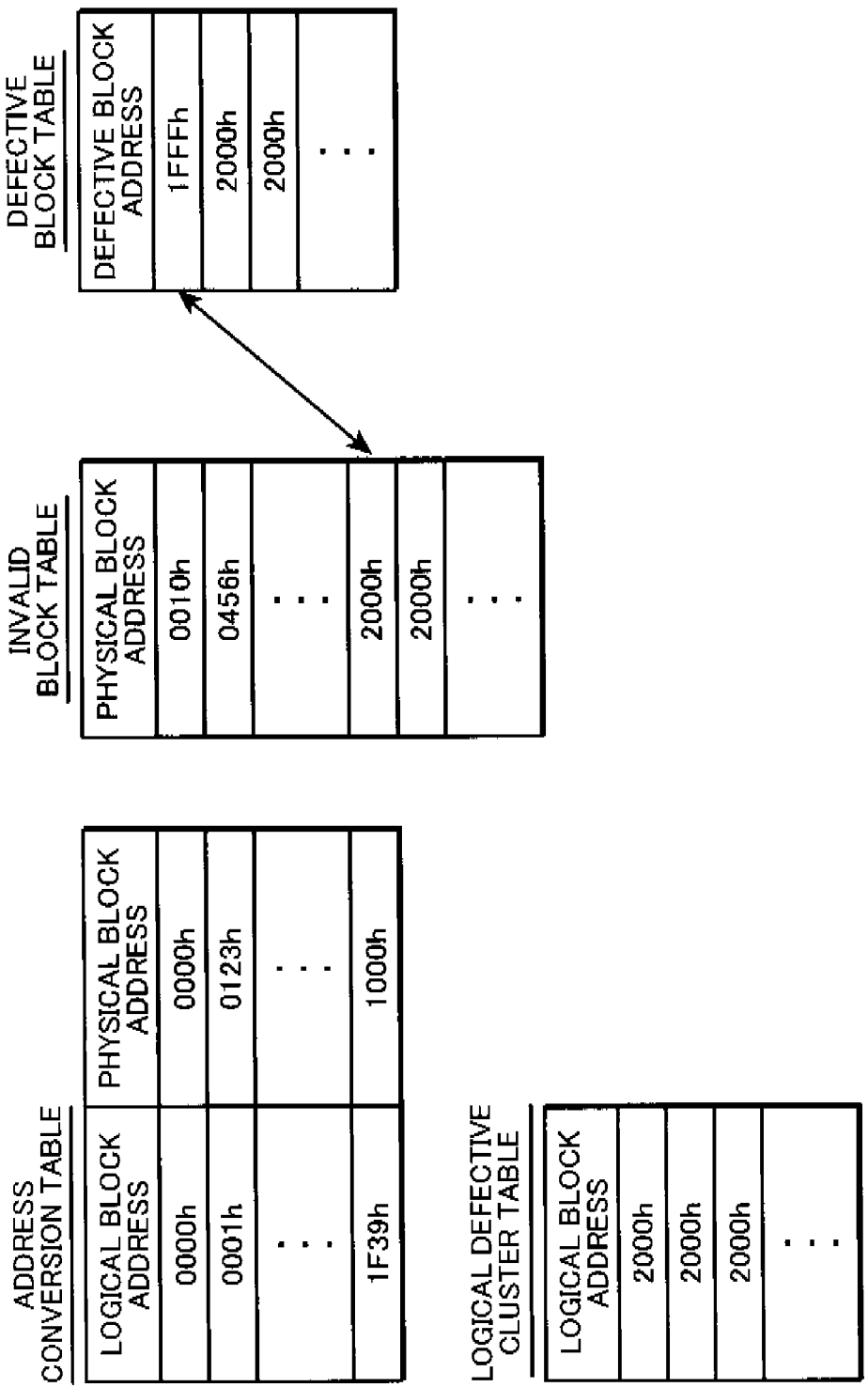
FIG. 12 is a diagram showing the state of the respective tables after being updated upon the occurrence of a defective block of the memory card depicted in FIG. 1.

FIG. 12 is a diagram showing the state of the respective tables after being updated upon the occurrence of a defective block. The control unit 108 interchanges the physical block address "1FFFh" of the write destination physical block of the invalid block table 110 with the invalid value "2000h", and interchanges the invalid value "2000h" of the defective block address (physical block address) of the defective block table 111 with the physical block address "1FFFh" of the defective block subject to the erasure or writing error.

<4.4 Registration of Logical Defective Cluster>

Figure 13:
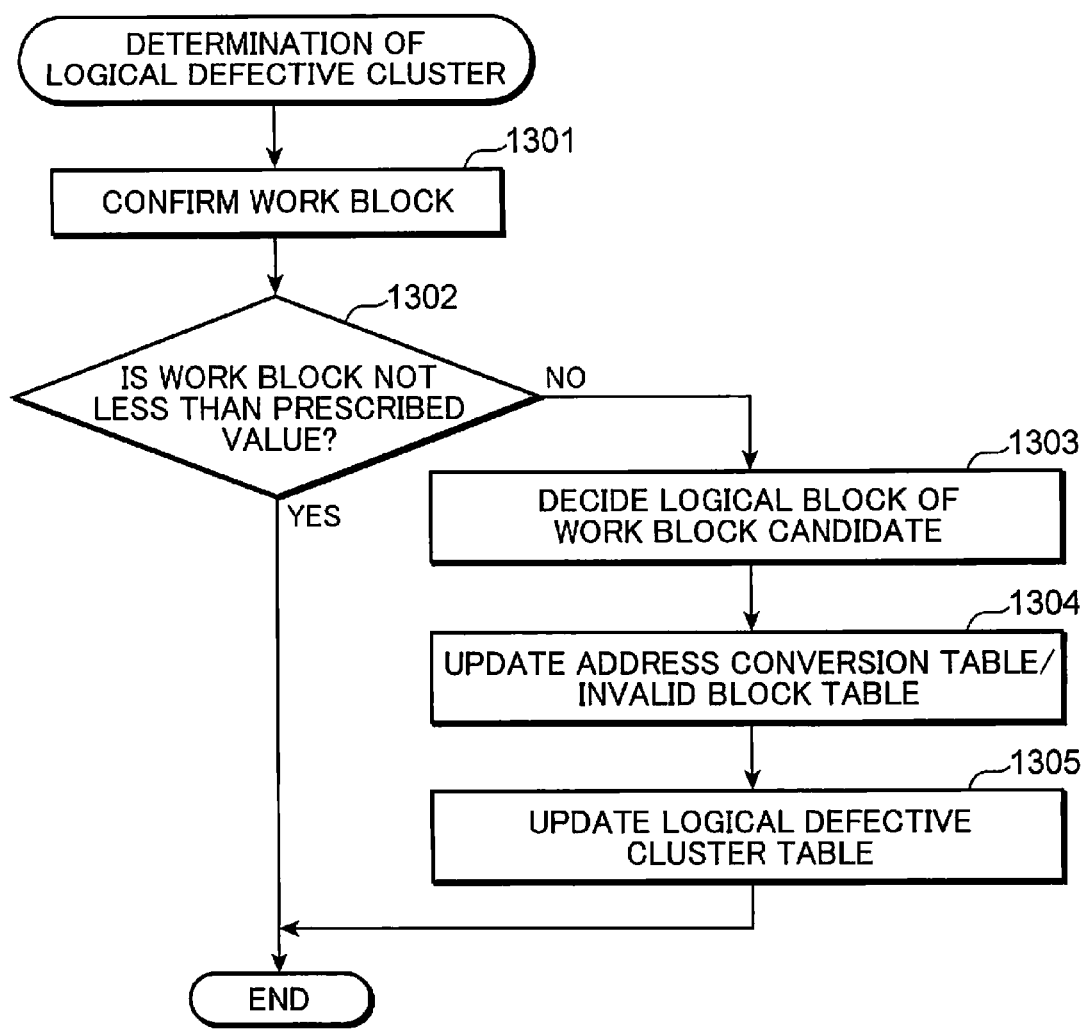
FIG. 13 is a detailed flowchart of the determination processing of the logical defective cluster depicted in FIG. 11.

FIG. 13 is a detailed flowchart of the processing 1107 for determining the logical defective cluster shown in FIG. 11. If numerous defective blocks occur, there are cases where the physical block address of valid values of the invalid block table 110 will run out, and it becomes impossible to decide the write destination physical block at the processing 802 in the write processing. If the write destination physical block cannot be decided, the writing of data from the host device 200 can no longer be performed. In order to avoid this kind of situation, the determination processing of the logical defective cluster is performed.

The processing 1301 is foremost explained. The control unit 108 confirms the work blocks. A work block is a physical block to which the write data from the host device 200 can be written. The conditions as a work block include not being a physical block to which valid data is written, and not being a defective block. The confirmation of the work blocks is performed by the control unit 108 referring to the defective block table 111, and not the invalid block table 110.

Although not explained above, the work blocks are confirmed without referring to the invalid block table 110 due to the following reasons. Specifically, in order to write new data from the host device 200, it is necessary to control the memory card 101 so that the valid physical block address (physical block that can be used for writing data) of the invalid block table 110 will not run out. However, if the writing of data to the logical block address in which the physical block address registered in the address conversion table 109 is the invalid value "2000h", the physical block address of the invalid block table 110 will be interchanged with the invalid value "2000h" even though there is no occurrence of an erase or writing error. Thus, in this embodiment, the defective block table 111, which enables the confirmation of the number of defective blocks, is referred to in order to determine whether there is a sufficient number of valid physical block addresses of the invalid block table 110; that is, whether the work blocks are not less than a prescribed value.

The determination processing 1302 is now explained. The control unit 108 determines whether the work blocks are not less than a prescribed value. If it is determined that there are work blocks of a prescribed value or higher, the processing is ended, and if the work blocks are less than a prescribed value, the routine proceeds to processing 1303. Here, as the prescribed value, various predetermined values may be used, and can be suitably decided by giving consideration to the effective logical address range, number of physical blocks of the flash memory unit 103, and so on.

The processing 1303 is now explained. If the number of work blocks is less than a prescribed value, the control unit 108 decides a logical block of the work block candidate. The decision of a logical block of the work block candidate means deciding the logical address of a logical block which disables access from the host device 200 as the logical block address.

In the decision of the logical block address at this time, the control unit 108 comprehends the file system that is used for the data written in the memory card 101, selects a sequential cluster (one or more partial areas within the effective logical address range) that can be used in the file system as the logical defective cluster, and decides the logical address of that logical defective cluster as the logical block address of the work block candidate.

Moreover, if the control unit 108 is unable to interpret the file system of the data written in the memory card 101, it selects, as the logical block address of the work block candidate, the logical block address in which the physical block address registered in the address conversion table 109 is an invalid value.

If there is no candidate in either case, the control unit 108 selects an arbitrary logical block address. As described above, the control unit 108 disables the subsequent reading and writing from the host device 200 from and to the logical block address (hereinafter referred to as the "logical defective block address") selected at the processing 1303 based on the following processing.

The processing 1304 is now explained. The control unit 108 updates the address conversion table 109 and the invalid block table 110. Specifically, the control unit 108 performs the update by interchanging the physical block address of the logical defective block address of the address conversion table 109 with the invalid value of the invalid block table 110.

The processing 1305 is now explained. The control unit 108 updates the logical defective cluster table 112. Specifically, the control unit 108 registers the logical defective cluster by writing the logical defective block address in the logical defective cluster table 112, and then ends the processing.

Figure 14:
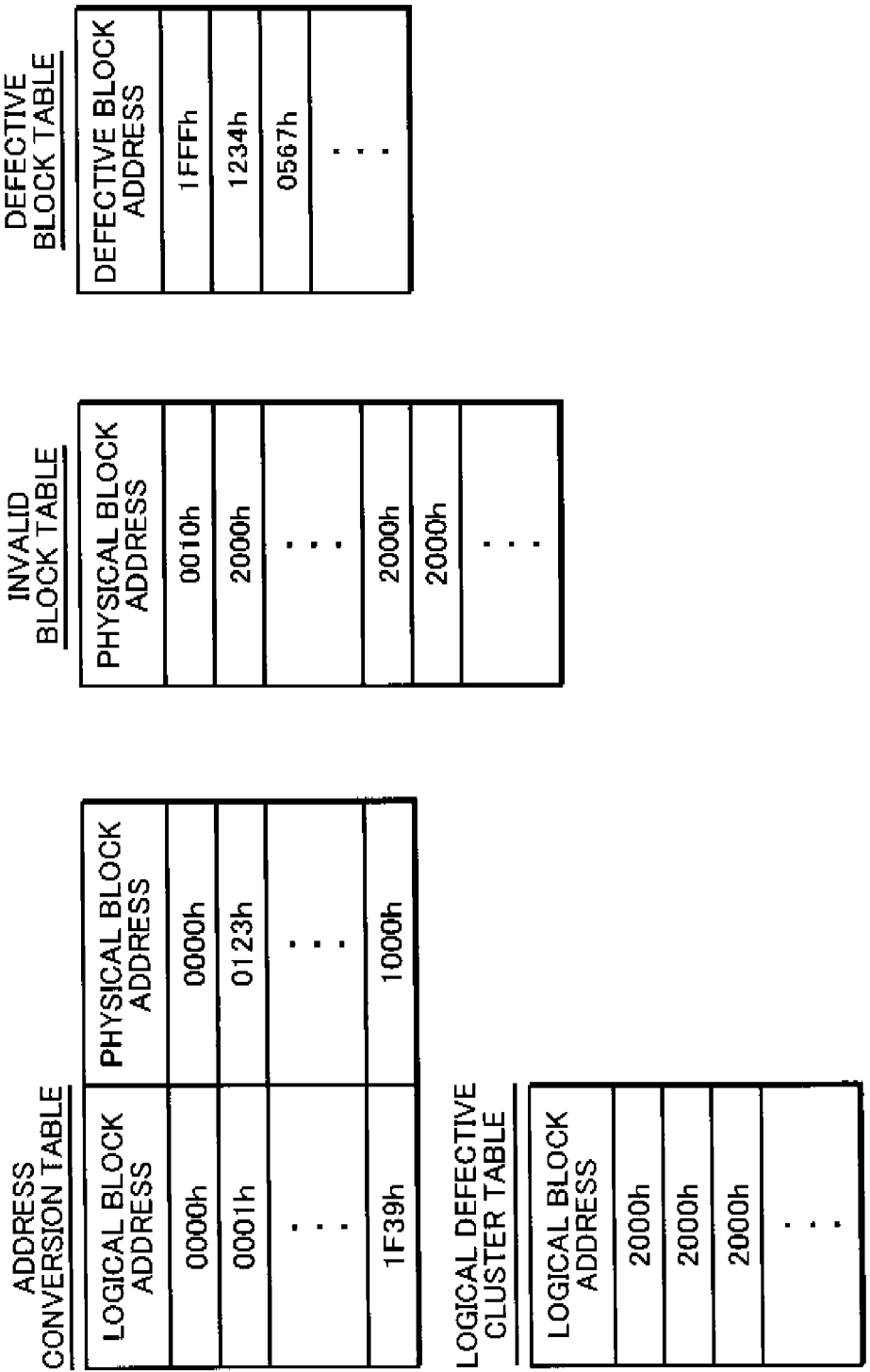
FIG. 14 is a diagram showing the state of the respective tables before the update of the logical defective cluster registration of the memory card depicted in FIG. 1.

A specific example of the update processing of the respective tables based on the processing 1304 and the processing 1305 is now explained. FIG. 14 is a diagram showing the state of the respective tables before the update of the logical defective cluster registration, and FIG. 15 is a diagram showing the state of the respective tables after the update of the logical defective cluster registration.

Figure 15:
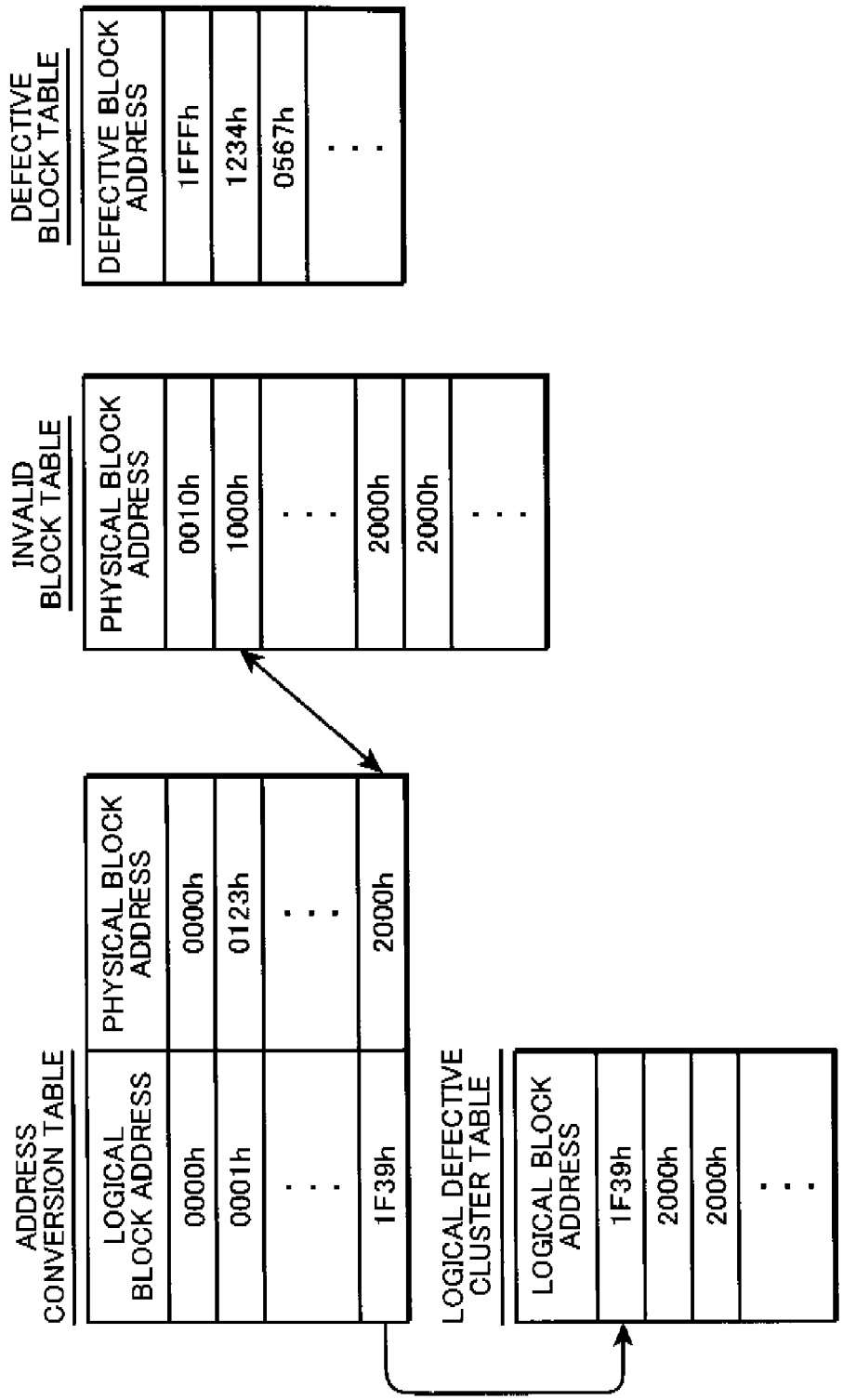
FIG. 15 is a diagram showing the state of the respective tables after the update of the logical defective cluster registration of the memory card depicted in FIG. 1.

As shown in FIG. 14, if "1F39h" is decided as the logical defective block address at the processing 1303 from the state of the tables before the update, the respective tables are updated to the state after the update shown in FIG. 15. Specifically, the control unit 108 exchanges the physical block address "1000h" that was in the logical block address "1F39h" of the address conversion table 109 and the invalid value "2000h" of the invalid block table 110, and thereby newly writes the logical defective block address "1F39h" in the logical defective cluster table 112.

As a result of performing the foregoing processing, an invalid logical address can be provided within the effective logical address range. Accordingly, even if a new defective block occurs, the number of valid physical block addresses of the invalid block table 110 can be increased by increasing the invalid logical addresses. Consequently, in this embodiment, even if a defective block occurs, the writing of new data can be performed since it is possible to maintain the effective capacity of the memory card 101 that was notified to the host device 200.

Note that, although the foregoing explanation caused the physical address of one physical block to correspond to the logical address of one logical block, the present invention is not limited to the foregoing example, and it is possible to cause the physical addresses of two or more physical blocks to correspond to the logical address of one logical block; for example, it is possible to cause the physical addresses of two or four physical blocks to correspond to the logical address of one logical block. Specifically, if two physical blocks correspond to one logical block, the address conversion table may associate the physical addresses of two physical blocks to the logical address of one logical block and store such association, and convert the logical address of one logical block designated by the host device 200 into the physical addresses (two physical block addresses) of the two physical blocks associated with the logical address (one logical block address) of that logical block. As described above, by suitably changing the foregoing processing according to the number of physical blocks corresponding to the logical block, the present invention can be similarly applied as described above even in cases where the logical address of one logical block corresponds to the physical addresses of two or more physical blocks.

The following is a summary of the present invention based on each of the embodiments described above. Specifically, the nonvolatile memory controller according to the present invention is a nonvolatile memory controller for controlling a nonvolatile memory configured from a plurality of physical blocks, comprising a control unit for controlling writing and/or reading of data to and from the physical block based on a logical address, from an external device, within an effective logical address range from a minimum logical address to a maximum logical address, a logical defective cluster table for storing information concerning a logical address of a logical defective cluster which is one or more partial areas within the effective logical address range and in which reflection of the writing of data to the logical address is disabled, and an address conversion table for storing corresponding information of a logical address of the effective logical address range and a physical address of the physical block on the data stored in the physical block, wherein, upon receiving a data write command from the external device for writing data to the logical address stored in the logical defective cluster table, the control unit disables the reflection of writing of data for the logical address to the physical block.

With this nonvolatile memory controller, one or more partial areas within the effective logical address range are set as the logical defective cluster, information concerning the logical address of the logical defective cluster is stored in the logical defective cluster table, and, upon receiving a data write command from the external device for writing data to the logical address stored in the logical defective cluster table, the writing of data to the physical block is disabled from being reflected to the logical address, and, corresponding information of a logical address of the effective logical address range and a physical address of the physical block is stored in the address conversion table, and, upon receiving a data write command from the external device for writing data to the logical address not stored in the logical defective cluster table, the address conversion table is used to convert the logical address from the external device into the physical address of the physical block, and the physical address is used to write data from the external device into the physical block. Accordingly, since the effective capacity of the nonvolatile memory that was notified to the external device can be maintained even if a defective block occurs, the writing of new data can be performed.

Preferably, upon receiving a data read command from the external device for reading data from the logical address stored in the logical defective cluster table, the control unit outputs predetermined fixed value data.

In the foregoing case, since predetermined fixed value data is output to the external device upon receiving a data read command from the external device for reading data from the logical address stored in the logical defective cluster table, it is possible to notify the external device that the logical address is inaccessible by the external device identifying the fixed value data.

Preferably, upon receiving a data read command from the external device for reading data from the logical address stored in the logical defective cluster table, the control unit does not output data.

In the foregoing case, since data is not output upon receiving a data read command from the external device for reading data from the logical address stored in the logical defective cluster table, it is possible to notify the external device that the logical address is inaccessible by the external device recognizing that data is not output.

Preferably, upon receiving a data write command from the external device for writing data to the logical address stored in the logical defective cluster table, the control unit notifies the external device of an occurrence of a writing error.

In the foregoing case, since the occurrence of a writing error is notified to the external device upon receiving a data write command from the external device for writing data to the logical address stored in the logical defective cluster table, it is possible to notify the external device that data cannot be written to the logical address.

Preferably, the nonvolatile memory controller further comprises an invalid block table for storing the physical address of the physical block in which data corresponding to the logical address is not stored and to which the writing of new data is capable of being performed, wherein when a defective block occurs during access to the physical block and the number of the physical blocks to which data from the external device is capable of being written is less than a predetermined value, the control unit decides a logical address which disables access from the external device, registers the decided logical address in the logical defective cluster table, disables the reflection of writing of data for the registered logical address to the physical block, and registers, in the invalid block table, information concerning a physical address in the address conversion table corresponding to the logical address which disables the reflection of writing of data to the physical block.

In the foregoing case, since the physical address of physical block in which data corresponding to the logical address is not stored and to which the writing of new data can be performed is stored in the invalid block table, and when a defective block occurs during access to the physical block and the number of the physical blocks to which data from the external device can be written is less than a predetermined value, a logical address which disables access from the external device is decided and registered in the logical defective cluster table, the reflection of writing of data for the registered logical address to the physical block is disabled, and information concerning a physical address in the address conversion table corresponding to the logical address which disables the reflection of writing of data to the physical block is registered in the invalid block table, it is possible to register the physical address of the physical block to which the writing of new data can be performed in the invalid block table even if numerous defective blocks occur, and the writing of data from the external device can be continued by using the physical block as the write destination physical block to which writing can be performed.

Preferably, the control unit selects, as the logical address which disables access from the external device, a logical address to which valid data is not written.

In the foregoing case, since the logical address to which valid data is not written can be registered in the logical defective cluster table and information concerning the physical address in the address conversion table corresponding to the registered logical address can be registered in the invalid block table, it is possible to secure the write destination physical block to which writing can be performed.

Preferably, the control unit selects, as the logical address which disables access from the external device, a logical address not corresponding to a valid physical address among the logical addresses stored in the address conversion table.

In the foregoing case, since the logical address not corresponding to the valid physical address among the logical addresses stored in the address conversion table can be registered in the logical defective cluster table, and information concerning the physical address in the address conversion table corresponding to the registered logical address can be registered in the invalid block table, it is possible to secure the write destination physical block to which writing can be performed.

Preferably, access to the physical block includes the writing and erasure of data to the physical block.

In the foregoing case, even if numerous defective blocks occur due to the writing or erasure of data to the physical blocks, the writing of new data can be performed since it is possible to maintain the effective capacity of the nonvolatile memory that was notified to the external device.

The nonvolatile storage device according to the present invention comprises any one of the foregoing nonvolatile memory controllers, and a storage unit including the nonvolatile memory.

Preferably, the nonvolatile memory includes a flash memory.

In the foregoing case, even if a defective blocks occurs in the flash memory, the writing of new data can be performed since it is possible to maintain the effective capacity of the flash memory that was notified to the external device.

Since the present invention is able to provide a highly user-friendly nonvolatile storage device capable of avoiding write errors even if numerous defective blocks occur, it is effective as a nonvolatile storage device using a nonvolatile memory, and a nonvolatile memory controller for controlling the nonvolatile memory.

This application is based on Japanese patent application serial no. 2010-067595, filed in Japan Patent Office on Mar. 24, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A nonvolatile memory controller for controlling a nonvolatile memory configured from a plurality of physical blocks, the nonvolatile memory controller comprising:
 a control unit for controlling writing and/or reading of data to and from a physical block, selected out of the plurality of physical blocks, based on a logical address received from an external device, within an effective logical address range from a minimum logical address to a maximum logical address;
 a logical defective cluster table for storing, while the minimum logical address and the maximum logical address remain unchanged, a logical address of a logical defective cluster which is one or more partial areas within the effective logical address range and in which reflection of the writing of data to the logical address of the logical defective cluster is disabled; and
 an address conversion table for storing logical addresses within the effective logical address range in correspondence with physical addresses of the plurality of physical blocks,
 wherein, upon receiving a data write command from the external device for writing data to the logical address of the logical defective cluster stored in the logical defective cluster table, the control unit disables the reflection of writing of data for the logical address of the logical defective cluster stored in the logical defective cluster table.

2. The nonvolatile memory controller according to claim 1, wherein, upon receiving a data read command from the external device for reading data from the logical address of the logical defective cluster stored in the logical defective cluster table, the control unit outputs predetermined fixed value data.

3. The nonvolatile memory controller according to claim 1, wherein, upon receiving a data read command from the external device for reading data from the logical address of the logical defective cluster stored in the logical defective cluster table, the control unit does not output data.

4. The nonvolatile memory controller according to claim 1, wherein, upon receiving a data write command from the external device for writing data to the logical address of the logical defective cluster stored in the logical defective cluster table, the control unit notifies the external device of an occurrence of a writing error.

5. The nonvolatile memory controller according to claim 1, further comprising an invalid block table for storing a physical address of a physical block in which valid data is not stored and to which the writing of new data is capable of being performed,
 wherein when a physical block accessed from the external device is a defective block and the and a number of physical blocks to which data from the external device is capable of being written is less than a predetermined value, the control unit selects a logical address to which access from the external device is disabled, registers the selected logical address to which access from the external device is disabled in the logical defective cluster table, and registers, in the invalid block table, the physical address in the address conversion table corresponding to the logical address to which access from the external device is disabled registered in the logical defective cluster table.

6. The nonvolatile memory controller according to claim 5, wherein the control unit selects, as the logical address to which access from the external device is disabled, a logical address to which valid data is not written.

7. The nonvolatile memory controller according to claim 5, wherein the control unit selects, as the logical address to which access from the external device is disabled, a logical address not corresponding to a valid physical address among the logical addresses stored in the address conversion table.

8. The nonvolatile memory controller according to claim 5, wherein the defective block is a physical block in which a writing error or an erasure error has occurred.

9. A nonvolatile storage device, comprising:

the nonvolatile memory controller according to claim 1; and a storage unit including the nonvolatile memory.

10. The nonvolatile storage device according to claim 9, wherein the nonvolatile memory includes a flash memory.

* * * * *